US007818291B2

(12) United States Patent
Ferguson et al.

(10) Patent No.: US 7,818,291 B2
(45) Date of Patent: Oct. 19, 2010

(54) DATA OBJECT ACCESS SYSTEM AND METHOD USING DEDICATED TASK OBJECT

(75) Inventors: John R. Ferguson, Concord, MA (US); Lisa Spampinato, Easton, MA (US); Sean T. McKenna, West Roxbury, MA (US); James R. Tice, Malden, MA (US); Ryszard Kilarski, Brookline, MA (US)

(73) Assignee: The General Electric Company, Schenectady, NY (US)

( * ) Notice: Subject to any disclaimer, the term of this patent is extended or adjusted under 35 U.S.C. 154(b) by 960 days.

(21) Appl. No.: 11/619,362

(22) Filed: Jan. 3, 2007

(65) Prior Publication Data

US 2007/0198571 A1  Aug. 23, 2007

Related U.S. Application Data

(60) Provisional application No. 60/764,835, filed on Feb. 3, 2006.

(51) Int. Cl.
*G06F 17/00* (2006.01)
*G06F 17/30* (2006.01)
*G06F 9/46* (2006.01)

(52) U.S. Cl. ............ 707/609; 707/803; 707/810; 705/8

(58) Field of Classification Search ............ 707/634, 707/625–626, 694, 705, 797–799, 822, 825–826, 707/607–609, 803, 810; 705/2, 8; 715/764, 715/853; 709/203, 215–220; 717/104–105
See application file for complete search history.

(56) References Cited

U.S. PATENT DOCUMENTS 6,282,531 B1 *  8/2001  Haughton et al. ............ 706/50
6,697,784 B2 *  2/2004  Bacon et al. ................ 705/9
6,978,422 B1 * 12/2005  Bushe et al. ............... 715/734
7,590,971 B2 *  9/2009  Ferguson et al. ........... 717/109

(Continued)

FOREIGN PATENT DOCUMENTS

WO   WO 2006/102683   *  9/2006

OTHER PUBLICATIONS

Luis Francisco-Revilla et a. Adaptive Medical Information Delivery Combining User, Task and Situation Models, ACM 2000, pp. 94-97.*
Liangzhao Zeng et al. "AgFlow: Agent-based cross-enterprise workflow management system", proceedings of the 27$^{th}$ VLDB conference,2001, 2 pages.*

*Primary Examiner*—Srirama Channavajjala
(74) *Attorney, Agent, or Firm*—Andrus, Sceales, Starke & Sawall, LLP

(57) ABSTRACT

A task management system for providing a graphically displayable worklist having one or more rows of work items, one or more of the work items each representing one or more data rows to be worked from one or more application data tables that are not a task object table of the task management system, the task management system comprising a task database having at least one task object, a first dedicated task object in said task database, said first dedicated task object having a second metadata associated therewith for graphically displaying information related to said first dedicated task object, a first view object having a first set of instructions for determining a first plurality of data rows of the one or more application data tables and a second set of instructions for creating a first association between each data row of said first plurality of data rows and said first dedicated task object, and a display generator for using said second metadata in initiating generation of display data representing a display image presenting a worklist, said worklist having a first one or more rows of application data table work items, each of said first one or more rows of application data table work items representing at least one data row of said first plurality of data rows.

21 Claims, 13 Drawing Sheets

U.S. PATENT DOCUMENTS

| | | | |
|---|---|---|---|
| 2002/0161750 A1* | 10/2002 | Rajarajan et al. | 707/3 |
| 2003/0220815 A1* | 11/2003 | Chang et al. | 705/2 |
| 2003/0225783 A1* | 12/2003 | Lee et al. | 707/103 R |
| 2004/0001103 A1* | 1/2004 | Fliess et al. | 345/810 |
| 2004/0111728 A1* | 6/2004 | Schwalm | 719/316 |
| 2004/0172326 A1* | 9/2004 | Yeo et al. | 705/14 |
| 2005/0015377 A1* | 1/2005 | Wan | 707/10 |
| 2005/0028158 A1* | 2/2005 | Ferguson et al. | 718/100 |
| 2006/0069599 A1* | 3/2006 | Hatoun et al. | 705/8 |
| 2006/0106846 A1* | 5/2006 | Schulz et al. | 707/101 |
| 2006/0117051 A1* | 6/2006 | Chin | 707/101 |
| 2008/0046862 A1* | 2/2008 | Sattler et al. | 717/104 |

* cited by examiner

DATA OBJECT ACCESS SYSTEM AND METHOD USING DEDICATED TASK OBJECT

RELATED APPLICATIONS

The present application is based on and claims benefit of U.S. Provisional Application No. 60/764,835, filed Feb. 3, 2006, which is hereby incorporated by reference herein.

FIELD OF THE DISCLOSURE

The present invention generally relates to the field of task management. In particular, the present invention is directed to a data object access system and method using a dedicated task object.

BACKGROUND OF THE DISCLOSURE

Task management systems have become increasingly important in various industries to manage and maintain large amounts of data on single systems and increasingly growing networks. Task management systems are typically populated with tasks for managing and maintaining data on one or more systems. In healthcare example tasks include, for example, correcting errors and/or omission in data, scheduling an appointment, and updating a medical record. Tasks are stored in a task database, such as a task object table, of the task management system and can be compiled for presentation to a user into a work or task list. With the growing complexity of data and application systems, there is a need to present tasks to a user that may originate from various applications that are associated with a task management system.

In a healthcare integrated delivery network (IDN) various service providers (for example, several hospitals, labs, and/or other healthcare service providers) may be aggregated as one entity. A user, such as a data clerk, in the IDN may be required to work tasks that originate from and/or impact multiple systems at one or more of the service providers within the IDN. Prior art systems may require the user to access a different task management system for each service provider system. The user is faced with multiple interfaces and the inefficiency of jumping from one interface to another to accomplish their work. In another prior art system tasks may be generated within one task management system from events that are generated across an enterprise, such as an IDN. However, each task is created and stored in the task table of the task management system itself for display in a work list. It is desired to have a more flexible task management system for displaying tasks from application data tables other than the task table of the task management system. It is also desired to readily give the functionality of a given task management system in displaying and utilizing tasks to other applications and application tables that may not inherently have such functionality.

FIG. 1 illustrates a typical prior art task management system 100 for displaying a work list 105. Task objects 110 are created within task management system 100 and stored in a task database 115 of task management system 100. Task database 115 may be and/or include a task object table 120 having task objects 110 therein. A processor 125 uses task objects 110 to construct and display work list 105. Work list 105 includes work items 130, which are typically arranged in rows in the displayed work list 105. Each work item 130 represents a different task of task objects 110. Task objects 110 populating task database 115 may be manually or automatically created using task management system 100. Task objects 110 may be created due to an event originating within task management system 100 or from an associated application. In each case a separate one of task objects 110 is created for each data object that requires managing or maintaining. Thus, all task objects 110 used to generate work list 105 are in task database 115 of task management system 100 and there is a different task object 110 for each work item 130 in displayed work list 105.

SUMMARY OF THE DISCLOSURE

A task management system for providing a graphically displayable worklist having one or more rows of work items, one or more of the work items each representing one or more data rows to be worked from one or more application data tables that are not a task object table of the task management system, the task management system comprising a task database having at least one task object, a first dedicated task object in said task database, said first dedicated task object having a second metadata associated therewith for graphically displaying information related to said first dedicated task object, a first view object having a first set of instructions for determining a first plurality of data rows of the one or more application data tables and a second set of instructions for creating a first association between each data row of said first plurality of data rows and said first dedicated task object, and a display generator for using said second metadata in initiating generation of display data representing a display image presenting a worklist, said worklist having a first one or more rows of application data table work items, each of said first one or more rows of application data table work items representing at least one data row of said first plurality of data rows.

The present disclosure comprises a task management system for providing a graphically displayable worklist having one or more rows of work items, one or more of the work items each representing one or more data rows to be worked from one or more application data tables that are not a task object table of the task management system, the task management system comprising a task database having at least one task object, a first dedicated task object in said task database, said first dedicated task object having a second metadata associated therewith for graphically displaying information related to said first dedicated task object, a first view object having a first set of instructions for determining a first plurality of data rows of the one or more application data tables and a second set of instructions for creating a first association between each data row of said first plurality of data rows and said first dedicated task object, and a display generator for using said second metadata in initiating generation of display data representing a display image presenting a worklist, said worklist having a first one or more rows of application data table work items, each of said first one or more rows of application data table work items representing at least one data row of said first plurality of data rows. Each task object of the task management system said at least one task object having associated therewith a first data related to one or more target objects requiring work and a first metadata for providing a graphical display of said each task object and wherein said display image comprises a first portion and a second portion, said first portion including said worklist and said second portion including additional data related to a first selected row of said first one or more rows of application data table work items when said first selected row is selected wherein said additional data includes a data selected from the group consisting of a predetermined instruction for working said first selected row, a summary data reflecting information related to said first selected row, and any combination thereof. The task management system further comprises a second dedicated task object in said task database, said second dedicated task object having a third metadata associated therewith for graphically displaying information related to said second dedicated task object, wherein said first view object has a third set of instructions for determining a second plurality of data rows of the one or more application data tables and fourth set of instructions for creating an second association between each data row of said second plurality of data rows and said second dedicated task object. The display image further comprises a second one or more rows of application data table work items, each of said second one or more rows of application data table work items representing at least one data row of said second plurality of data rows. The task management system further comprises a display device for displaying said display image wherein at least one of the one or more application data tables includes application configuration data objects for a first computer application wherein said second metadata includes a fifth set of instructions for initiating generation of a second display image allowing a user viewing said second display image to configure said first computer application and wherein said first computer application is the task management system. The first dedicated task object of the task management system is limited to one instance in said task database wherein said first dedicated task object includes a third association to a target object, said target object being a system object and said second metadata includes instructions for arranging said work items of said worklist in a predetermined desired order. At least one of said first associations in the task management system is between two or more data rows of said first plurality of data rows and said first dedicated task object and wherein said display image summary information related to said two or more data rows of said first plurality of data rows in at least one of said first one or more rows of application data table work items.

Another aspect of the present disclosure is a computer-implemented method of providing a displayable worklist having one or more rows of work items, the method comprising generating a first dedicated task object in a task database of a task management system, said first dedicated task object having associated therewith a first metadata for generating a display image of information related to said first dedicated task object, determining a first desired set of application data objects to be worked from one or more application data tables other than a task object table of said task management system, associating each data object of said first desired set with said first dedicated task object, and using said first metadata in initiating generation of data representing a display image, said display image including a worklist having a first plurality of rows, each of said first plurality of rows representing a different one of said first desired set of application data objects. The computer-implemented method further comprises using a display device to display said at least one display image wherein said display image comprises a first portion and a second portion, said first portion including said worklist and said second portion including additional data related to a first selected row of said first plurality of rows when said first selected row is selected and wherein said additional data includes a data selected from the group consisting of a predetermined instruction for working said first selected row, a summary data reflecting information related to said first selected row, and any combination thereof wherein said additional data includes a predetermined instruction for working said first selected row.

The computer-implemented method further comprises generating a second dedicated task object in said task database, said second dedicated task object having a second metadata associated therewith for generating a display image of information related to said second dedicated task object, determining a second desired set of application data objects to be worked from said one or more application data tables, associating each data object of said second desired set with said second dedicated task object, wherein said display image further comprises a second plurality of rows, each of said second plurality of rows representing at least one data row of said second desired set and further comprises working one of said first plurality of rows to configure a first computer application, limiting said first dedicated task object to one instance in said task database and further comprising associating said first dedicated task object to a system object to limit said first dedicated task object to one instance. The computer-implemented method further comprises arranging said first plurality of rows in said worklist in a predetermined desired order, including in each association between said first dedicated task object and said first desired set an association to two or more data objects of said first desired set. The computer-implemented method wherein said using step comprises displaying summary information related to said two or more data objects in a single row of said first plurality of rows.

Yet another aspect of the present disclosure is a machine readable medium containing computer executable instructions implementing a method of providing a displayable worklist having one or more rows of work items, the instructions comprises a first set of instruction for generating a first dedicated task object in a task database of a task management system, said first dedicated task object having associated therewith a first metadata for generating a display image of information related to said first dedicated task object, a second set of instruction for determining a first desired set of application data objects to be worked from one or more application data tables other than a task object table of said task management system, a third set of instruction for associating each data object of said first desired set with said first dedicated task object, and a fourth set of instructions for using said first metadata in initiating generation of data representing a display image, said display image including a worklist having a first plurality of rows, each of said first plurality of rows representing a different one of said first desired set of application data objects.

BRIEF DESCRIPTION OF THE DRAWINGS

FIG. 7 illustrates a screen shot according to an embodiment of the present disclosure.

FIG. 10 illustrates a screen shot according to an embodiment of the present disclosure.

DETAILED DESCRIPTION

Examples of the disclosed invention are depicted in FIGS. 2 to 13, although it should be understood that the present invention is not limited to these (or any other) particular embodiments, but rather is intended to cover all that falls fairly within the broad scope of the appended claims.

Figure 1:
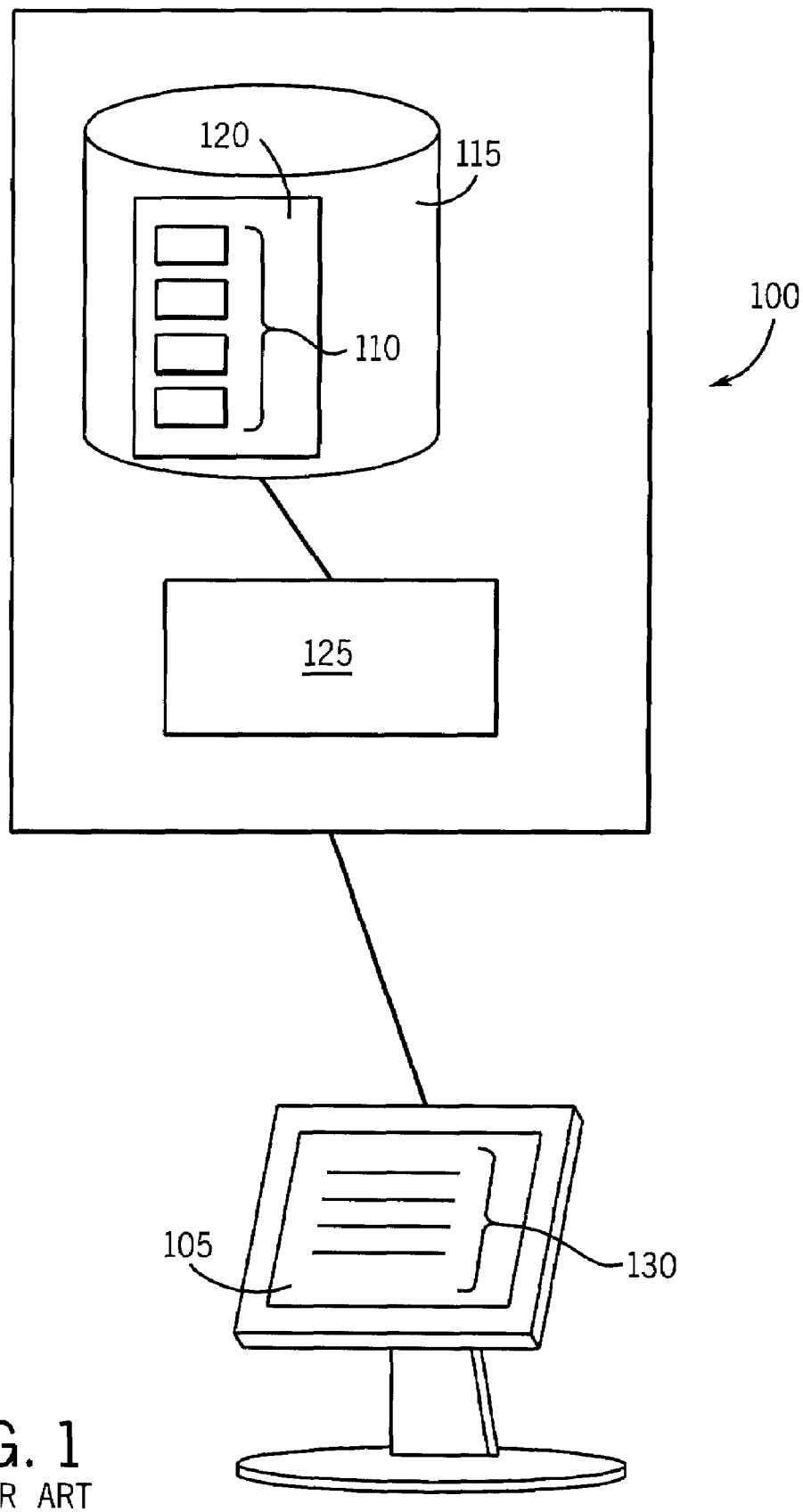
FIG. 1 illustrates a typical prior art task management system.
Figure 2:
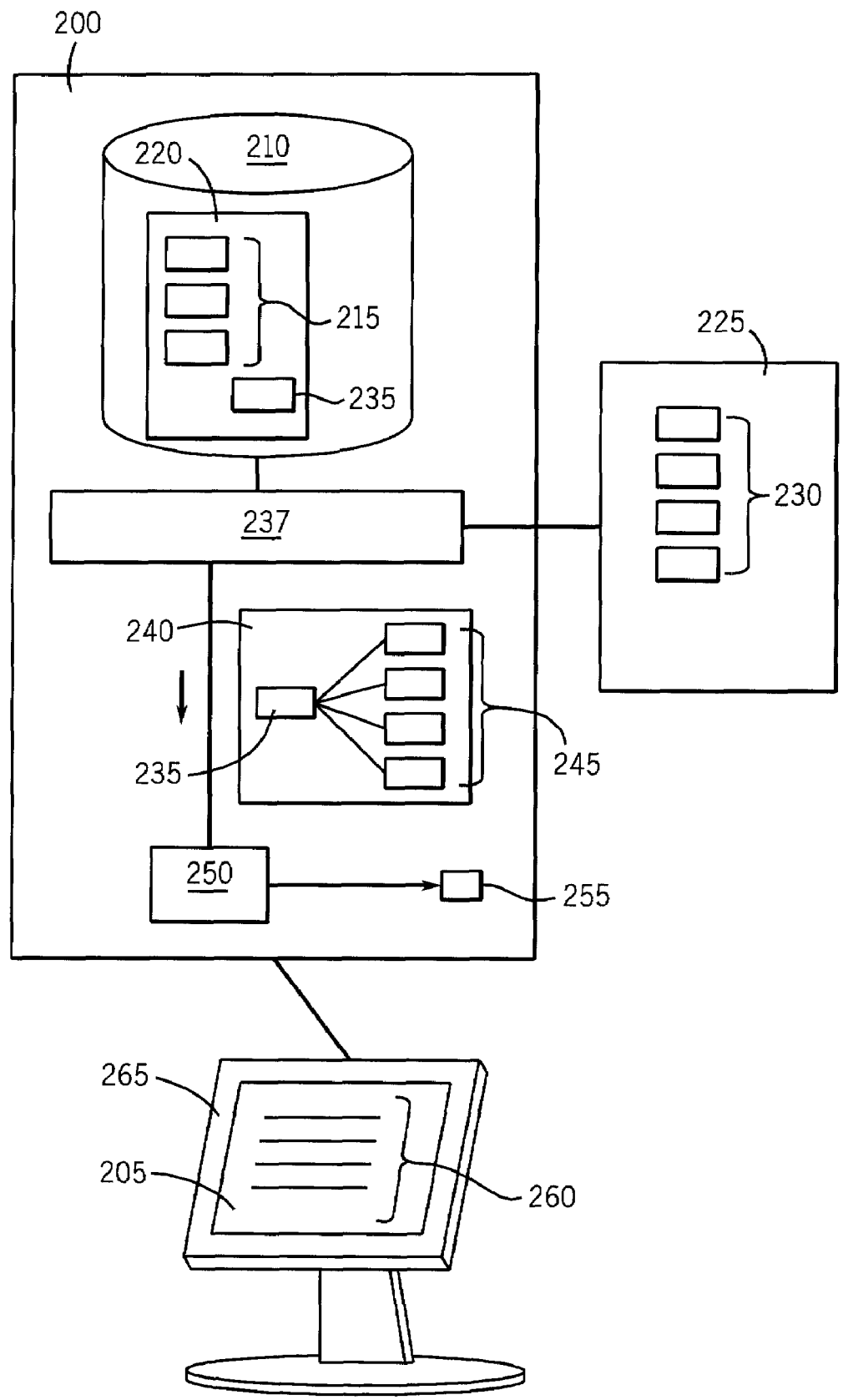
FIG. 2 illustrates a block diagram of an embodiment of a task management system of the present disclosure.

FIG. 2 illustrates one embodiment of the present invention including a task management system 200 for providing a displayable work list 205. Task management system 200 includes a task database 210 having one or more task objects 215. Task objects 215 may be included in a task object table 220. Task objects 215 are shown as being included in a single task object table 220. It is contemplated that task objects 215 of task management system 200 may exist in one or more task object tables of task management system 200. However, each of these task object tables are the tables typically used for task objects of the task management system. Task management system 200 is in communication with an application data table 225 having one or more application data objects 230. In one example, application data table 225 may be associated with task management system 200. In such an example, application data table 225 may reside on the same computing system as task management system 200 or on a different computing system that is in communication with the computing system having task management system 200. In another example (not shown), application data table 225 may be a part of task management system 200.

An application data object, such as one or more application data objects 230, may be any data object of a data table other than a task object table of a task management system of the present invention. Example application data tables include, but are not limited to, an appointment table, a patient table, a task object table of a system other than a task management system of the present invention, an application configuration table (of a task management system of the present invention or another system), a healthcare claim table, a hold bill table, a view object table, claim edit table, and any combinations thereof. Example application data objects include, but are not limited to, an appointment object, a patient object, a physician object, a task object of a system other than a task management system of the present invention, an application configuration object, a healthcare claim object, a hold bill object, and a view object.

Task database 210 includes at least one dedicated task object 235. In one embodiment, a dedicated task object, such as dedicated task object 235, resides in the same task object table, for example task object table 220, as regular task objects 215. In one embodiment, dedicated task object 235 does not itself represent a workable item as is typical of other task objects 215 in task object table 220. Instead, dedicated task object 235 can be used to allow task management system 200 to access application data objects 230 residing in application data tables, such as application data table 225, that are not a task object table of task management system 200.

Task management system 200 may also include a processor 237. Processor 237 may be a hardware module or software instruction for determining a desired set of application data objects 230 to be part of displayable work list 205 and associating each of the desired set of application objects with dedicated task object 235. In one example, the result of this determination and association may be stored in a storage media (volatile or nonvolatile) for use in creating a displayable work list. In another example, the result of this determination and association is used directly in creating a displayable work list. FIG. 2 illustrates an example result 240 including a desired set 245 of application data objects, each associated with dedicated task object 235.

Task management system 200 may also include a display generator 250. Display generator 250 may include hardware and/or software instructions for creating a data 255 representing a display image. In one example, display generator 250 utilizes information from dedicated task 235 and each of desired set 245 to generate data 255 representing a display image including a displayable work list 205 having a plurality of rows or work items 260. Each of the plurality of rows 260 represents at least one different application data object of desired set 245. In this example, all of the work items 260 utilize only one task object from task management system 200 to generate displayable work list 205.

In one embodiment, a display device 265 may be in communication with task management system 200 for utilizing data 255 to display displayable work list 205. Any well known display device may be utilized with a system and/or method of the present invention. Example display devices include, but are not limited to, a monitor, such as a liquid crystal display (LCD), plasma, or a cathode ray tube; a handheld device, such as a personal data assistant (PDA) or mobile telecommunications device; a printer; and any combinations thereof. In one example, display device 265, may be directly connected to task management system 200 (e.g., via connection to a computing system including task management system 200). In another example, display device 265 may be remote to, or connected to a device that is remote to, task management system 200 (e.g., via a wired or wireless communication network).

In one aspect, a user of display device 265 may work work items 260 of displayable work list 205 when it is displayed using display device 265. Utilizing work list 205 a user may perform a variety of data maintenance and management procedures related to a selected work item of work items 260. Example data maintenance and management procedures include, but are not limited to, working an application data object represented by a work item; entering, updating, and/or modifying information of an application data object represented by a work item; configuring an attribute of an application; entering a new application data object in an application data table associated with the dedicated task utilized to generate a work list; entering, updating, and/or modifying information of an application data object associated with an application data object represented by a work item; and any combinations thereof.

Figure 3:
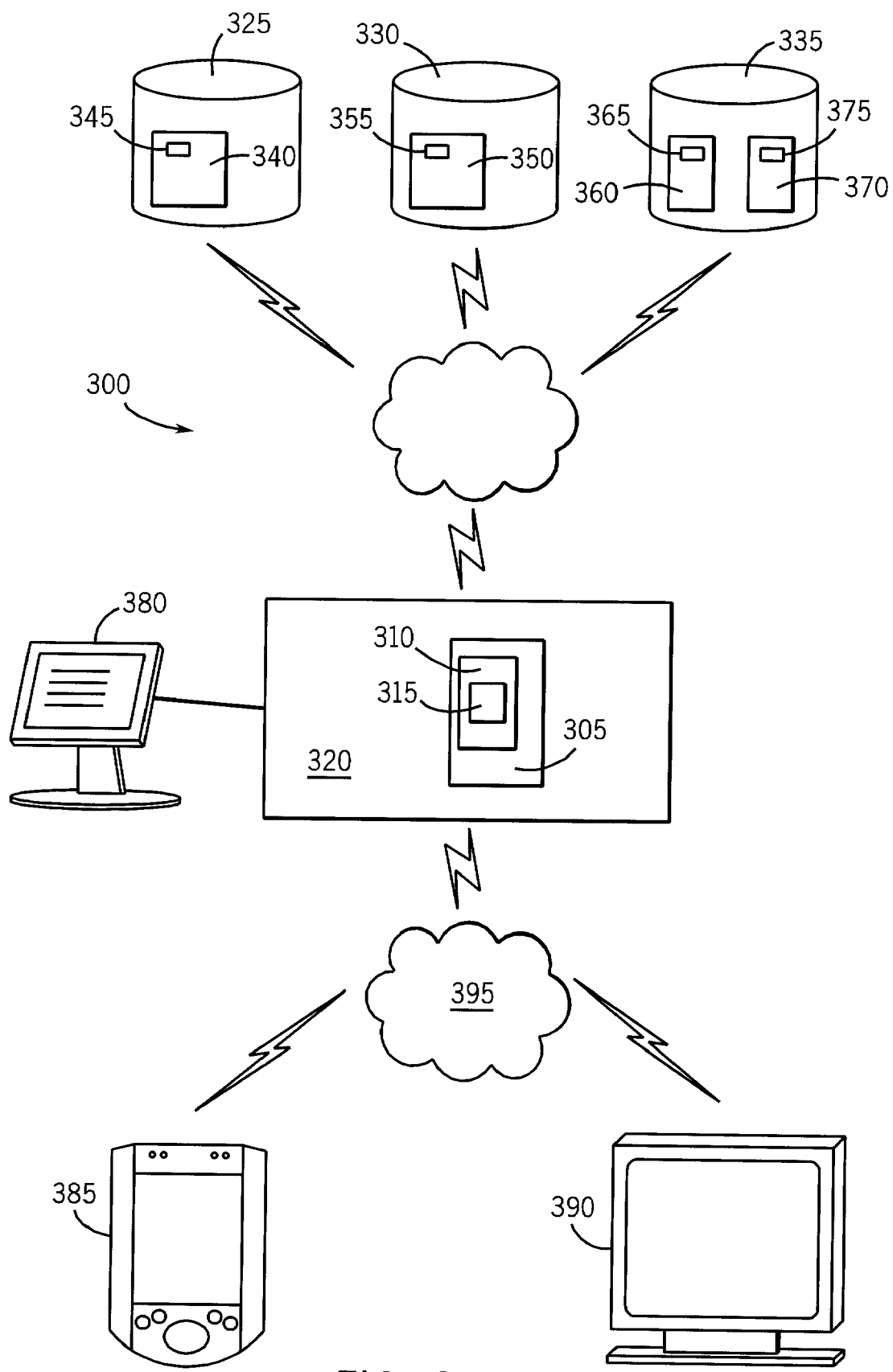
FIG. 3 illustrates a block diagram of an embodiment of a task management system of the present disclosure.

FIG. 3 illustrates one exemplary generalized computing environment 300 for one embodiment of a task management system 305 of the present invention. Task management system 305 includes a task object table 310 and a dedicated task object 315. Task management system 305 is included in a computing system 320, such as a server. Computing system 320 may be in communication (wired or wireless) with one or more application systems 325, 330, 335 via a distributed network 395. Example distributed networks include, but are not limited to, the Internet, a local area network (LAN), wide area network, (WAN), telecommunications network, satellite based network, and any combinations thereof. In an alternative embodiment, computing system 320 may be directly in wired or wireless communication with one or more application systems, such as application systems 325, 330, 335. Each of application systems 325, 330, 335 may reside on a separate computing system or a single computing system may share a plurality of application systems 325, 330, 335.

Application system 325 includes application data table 340 having one or more application data objects 345. Application system 330 includes application data table 350 having one or more application data objects 355. Application system 335 includes application data table 360 having one or more application data objects 365 and application data table 370 having one or more application data objects 375. In alternative embodiments, one or more additional application data tables may reside on computing system 320 and/or as part of task management system 305.

Computing system 320 may be in communication with a display device 380. Display device 380 may display a displayable work list generated by task management system 305. Computing system 320 may also be in wired or wireless communication with one or more remote display devices 385, 390 via a distributed network 395. In one example, remote display device 385, a handheld computing system having a display panel, may display a displayable work list generated by task management system 305. In another example, remote display device 390, a computer workstation, may display a displayable work list generated by task management system 305.

Figure 4:
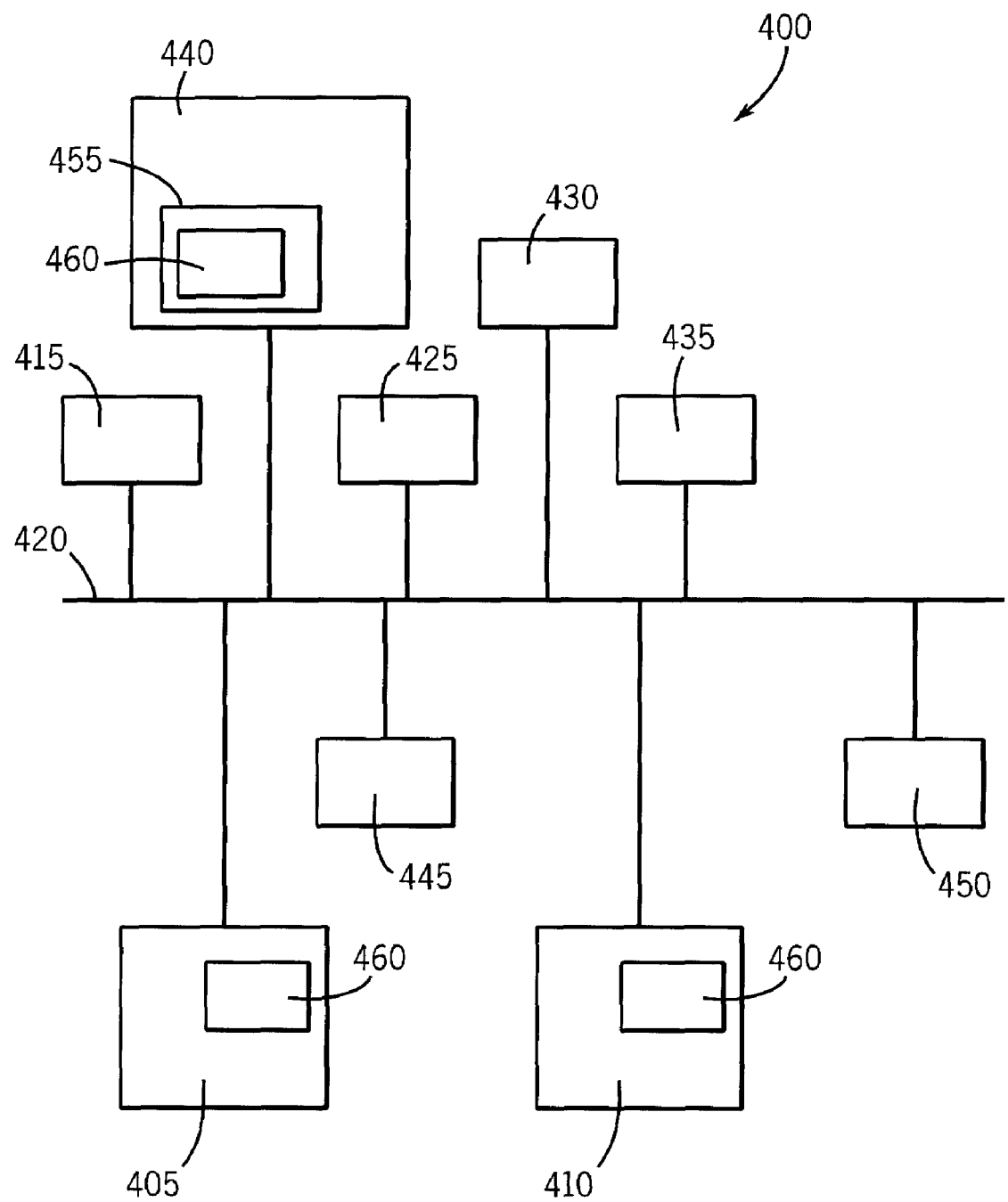
FIG. 4 illustrates a diagrammatic representation of an embodiment of a computer system configured to perform any of the methods of the present disclosure.

FIG. 4 shows a diagrammatic representation of one embodiment of a machine in the exemplary form of a computer system 400 within which a set of instructions, for causing the machine to perform any one of the methodologies of the present invention, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 400 includes a processor 405, a main memory 410 and a static memory 415, which communicate with each other via a bus 420. Computer system 400 may further include a video display unit 425 (e.g., a liquid crystal display (LCD) or a cathode ray tube (CRT)). Computer system 400 may also includes an alpha-numeric input device 430 (e.g., a keyboard), a cursor control device 435 (e.g., a mouse), a media input device 440 (e.g., a disk drive, a universal serial bus (USB) port, etc.), a signal generation device 445 (e.g., a speaker), and/or a network interface device 450.

Media input device 440 includes a machine-readable medium 455 on which is stored a set of instructions (i.e., software) 460 embodying any one, or all, of the embodiments of the present invention. Software 460 is also shown to reside, completely or at least partially, within the main memory 410 and/or within the processor 405. Software 460 may further be transmitted or received via the network interface device 450. For the purposes of this specification, the term "machine-readable medium" shall be taken to include any medium that is capable of storing or encoding a sequence of instructions for execution by the machine and that causes the machine to perform any one of the methodologies of the present invention. The term "machine-readable medium" shall accordingly be taken to include, but not be limited to, solid-state memories (e.g., random access memory (RAM), flash memory, etc.), and optical and magnetic disks.

Figure 5:
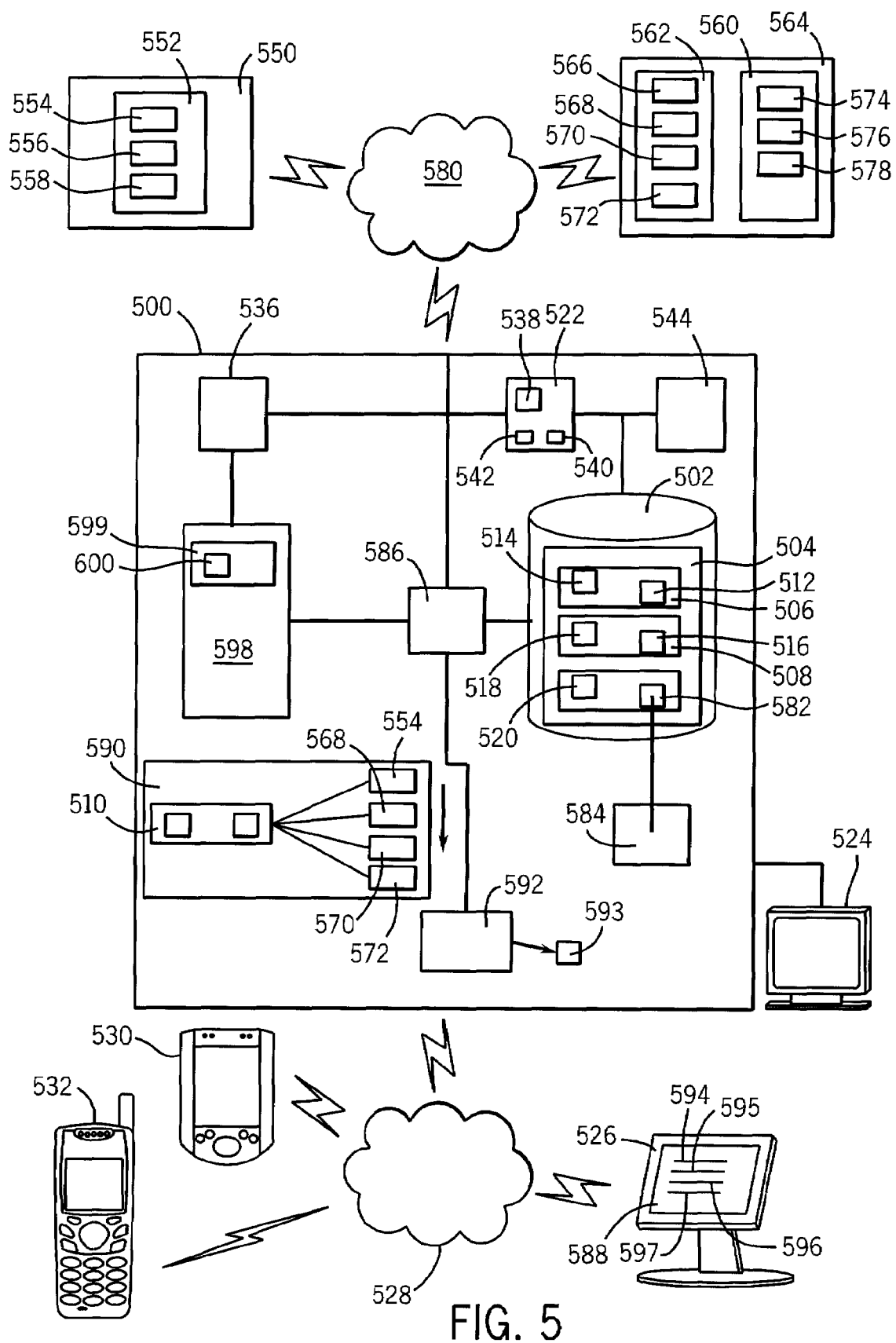
FIG. 5 illustrates a block diagram of an embodiment of a task management system of the present disclosure.

FIG. 5 illustrates another embodiment of a task management system 500 of the present invention. Task management system 500 includes a task database 502 having a task object table 504. Task object table 504 includes a task object 506, a task object 508, and a dedicated task object 510. Task object table 504 may include any number of additional conventional task objects and/or dedicated task objects. Task object table 504 includes three objects her for exemplary illustration only. Task object 506 has information 512 relating task object 506 to a target object requiring work. Task object 506 also has metadata 514 including instructions for creating a displayable image representing task object 506 and information related thereto. Task object 508 has information 516 relating task object 508 to a target object requiring work. Task object 508 also has metadata 518 including instructions for creating a displayable image representing task object 508 and information related thereto. In one example, metadata 514, 518 may be included in the associated task object 506, 508. In another example, metadata 514, 518 may reside in a separate location of task management system 500 (e.g., a separate task definition table). When a displayable work list is generated that includes task object 506 and/or task object 508, the work list includes only one work item for each of task object 506 and/or task object 508. When a user accesses such a work item represented in a displayed work list, the user may work the specific task object 506, 508 and the one or more target objects associated therewith.

Dedicated task object 510 has associated therewith metadata 520 including instructions for creating a displayable image representing dedicated task object 510 and information related thereto. In one example, all or a portion of metadata 520 is included in dedicated task object 510. In another example, all or a portion of metadata 520 is located in a separate location of task management system 500 (e.g., task definition table 522). Task object display metadata may include instructions for all aspects of displaying information related to a dedicated task object and associated data objects including, but not limited to, graphical display aspects, display configuration, method of display, display interface control and functionality, and any combinations thereof.

In one embodiment of the present invention, a user may access task management system 510 from an access device (e.g., access device 524, display devices 528, 530, 532). The user may utilize a setup module 536 to perform one or more system setup procedures. Setup module 536 includes instructions for performing the one or more system setup procedures. Example system setup procedures include, but are not limited to, creating and/or modifying a task definition, manually entering a task, creating and/or modifying a view, other setup procedures as may be required by the task management system, and any combinations thereof.

Task management system 500 may include one or more task definitions, typically residing in a task definition table, such as task definition table 522. Task definition table 522 includes task definitions 538, 540, 542. A task object, such as dedicated task object 510, may be created using one of task definitions 538, 540, 542. A task definition, such task definitions 538, 540, 542, may include, among other data, data representing instructions for defining one or more attributes of a task object, instructions (i.e., metadata) for displaying a task object and/or information related to the task object, instructions for providing a working environment (including interactive interface) for a task object and any data objects associated therewith (in the task object and/or task definition, a displayable list of predetermined work steps associated with a task object, instructions for providing a displayable summary of information associated with a task object, instructions for what event may trigger generation of a task object, and any combinations thereof. Typically a task definition will include instructions related to a particular type of task object. For example, in a healthcare context, task object types may include, but are not limited to, a hold bill edit task object type, a claim edit task object type, a schedule appointment task object type, insurance follow-up, and any combinations thereof. Task definition table 522 may include one or more task definitions for a particular type of task. Each task definition for a task type may provide instructions for different attributes and display properties for task objects generated using the task definition. Once created a task object may refer back to a corresponding task definition to access information associated with the corresponding task definition.

Task management system 536 may include a task generator 544. Task generator 544 includes instructions for automatically and/or manually generating task objects, such as task objects 506, 508, 510. In one example, a task object may be generated by task generator 544 in response to any one or all of an event within task management system 500, an event originating in a separate system from task management system 500, and an event triggered by a user or an administrator of task management system 500. Task generator 544 may utilize one of task definitions 538, 540, 542 in generating a task object.

In one example, a task object, such as conventional task objects 506, 508, may be generated in response to a source object filing to task management system 500. A source object is any data object that may file to task management system 500 to trigger generation of a task object. For example, in a healthcare context, an attribute of a financial claim object may be modified in a claim object table associated with task management system 500. The modification may impact another object, such as a healthcare provider object when the modified attribute included a changed provider insurance identification number. The impacted object, in this case the healthcare provider object, is a target object that may require work done in response to the modified source object. Task generator 544 may detect the presence of the event of modifying the source financial claim object. In one example, where the event corresponds with a task definition (e.g., task definition 538) for generating a task object to work the corresponding target healthcare provider object, a task object (e.g., task object 506) may be created and entered to task object table 504. Multiple source objects may require the same action with respect to one or more target objects. For example, multiple financial claim objects referencing the same provider may have a similar attribute related to the provider that is modified in each financial claim object. These modifications all impact the same target provider object. In such a case, one task object may be generated for each source object impacting the same one or more target objects. Alternatively, task management system 500 may track source objects and task objects generated therefrom (e.g., in a source object table) to provide that only one task object is generated for all source objects similarly impacting the same one or more target objects. A generated task object, such as task object 506, may include data reflecting the one or more source and target objects associated therewith.

In the case of conventional task object types, it is possible for more than one task object instance to be generated from the same task definition. For example, two financial claim objects may have similar modifications that impact different target objects. The same task definition (e.g., task definition 540) may be invoked to generate a first task object instance (e.g., task object 506) for the first target object (e.g., target object represented by information 512) and a second task object instance (e.g., task object 508) for the second target object (e.g., target object represented by information 516).

In another example, a task definition, such as task definition 540, may include instructions related to a dedicated task object. Task generator 544 may be utilized to generate dedicated task object 510. In one aspect, dedicated task object 510 is generated to provide access to the functionality and interface of task management system 500 to one or more application data objects residing in one or more application data tables. In another aspect, dedicated task object 510 may not require work in the same manner as task objects 506, 508 and may not itself be displayed as a work item of a work list. In one example, dedicated task object 510 is not worked for the benefit of a particular target object and has a target object attribute 582 associated with a system object 584. A system object, such as system object 584, is an object that exists at the system level of task management system 500. Typically, only one system object exists. Since there is only one system object, only one dedicated task object instance will be generated from each task definition. It is contemplated that other mechanisms for limiting a dedicated task object to one instance may be employed. In one example, an attribute of the task definition or the dedicated task object may be set to indicate the generation of only one dedicated task object instance from each dedicated task definition. Although task definition table 522 is shown with only one task definition 540 for generating dedicated task object 510, task definition table 522 may include a plurality of task definitions for creating a variety of dedicated task objects.

In yet another example, a task object, such as dedicated task object 510, may have any number of additional attributes associated with the task object. Each attribute may include information, and/or a pointer to information stored elsewhere (e.g., a task definition), that defines additional functionality of the task object. Example attributes include, but are not limited to, indication of one or more source objects associated with the task object, an audit trail, indication to task management system 500 that a dedicated task object should not be purged in any task object purging routine of task management system 500, task object and/or work item interface behavior, and any combinations thereof.

Task management system 500 may be in communication with an associated application 550 having an application data table 552. Application data table 552 includes application data objects 554, 556, 558. Task management system 500 may also be in communication with an associated application 560 having an application data table 562 and an application data table 564. Application data table 562 includes application data objects 566, 568, 570, 572. Application data table 564 includes application data objects 574, 576, 578. Associated applications 550, 560 are shown in communication with task management system via distributed network 580. In alternative examples, it is contemplated that one or more associated applications and/or application data tables may also be directly part of task management system 500, resident on the same computing system as task management system 500, and any combination thereof.

Task management system 500 may include a data object association module 586. Data object association module 586 determines a desired set of application data objects from associated application data tables 552, 562, 564 to be included in a displayable work list 588. In one example, displayable work list 588 may be displayed using a display device (e.g., display devices 524, 526, 530, 532). Data object association module 586 associates each of the data objects of the desired set of application data objects with one dedicated task object, such as dedicated task object 510. For example, application data objects 554, 568, 570, 572 may have one or more attributes of a desired set of data objects. Data object association module 586 associates application data objects 554, 568, 570, 572 with dedicated task object 510. For illustrative purposes, the results of the association are shown in box 590. In one example, the results of the association may be stored in a memory (volatile or nonvolatile) for an amount of time. In another example, the results of the association may be directly presented for use. A display generator 592 may utilize the stored or directly presented results of the association to generate a display data 594 representing a display image including a displayable work list 588. Display generator 592 utilizes display metadata associated with dedicated task 510 in generating display data 594. Example display images are illustrated and discussed below with respect to FIGS. 6 to 13. Display data 593 may be displayed and/or accessed via one or more display devices, such as display devices 524, 526, 530, 532. For illustrative purposes, _displayable work list 588 is shown on display device 526. Displayable work list 588 includes work items 594, 595, 596, 597 arranged as rows. Each of work items 594, 595, 596, 597 represents a different one of application data objects 554, 568, 570, 572 of the desired set.

Each work item 594, 595, 596, 597 may include one or more work steps to be taken in working and/or accessing application data objects 554, 568, 570, 572. In one example, the substance and displayable characteristics of the one or more worksteps may be defined in dedicated task object 510 and/or associated task definition 540. A user may take one or more actions related to a work item, such as work items 594, 595, 596, 597. In one example, the one or more action steps taken may be logged with each action step being associated with the corresponding dedicated task object and/or application data object. An action step log table may be utilized by a task management system of the present invention for logging action steps and associating them with a corresponding object.

In another embodiment, task management system 500 may include one or more views, each for defining attributes of a desired set of application data objects to be presented in a displayable work list. Task management system 500 includes view object table 598 having view object 599. View object 599 includes data 600 including instructions for determining a desired set of application data objects to be displayed in displayable work list 588. Data 600 may also include instructions for associating each of the data objects of the desired set with a dedicated task object, such as dedicated task object 510. Data 600 may further include display metadata for assisting in the generation of a display image. View object 599 maybe utilized by data object association module 586 and display generator 592 to produce display data 593. In one example, a view object, such as view object 599, may include a SQL query for accessing desired application data objects and associating each application data object with a dedicated task object. An example SQL query follows:

```
SELECT Bump.Id->PatNm as Patient
    Bump.DateBumped as BumpDt,
    Bump.Dt as ApptDt,
    Bump.Tm as Time
    Type.Mnemonic as Type,
    Bump.Provider->Mnemonic as Prov,
    Bump.Department->Mnemonic as Loc,
    Appt.Location->Mnemonic as Loc,
    CASE
    WHEN Appt.DatePrimaryLinkedAppt1 is not null THEN 'Y'
    WHEN Appt.DatePrimaryLinkedAppt2 is not null THEN 'Y'
    ELSE NULL
    END Link,
    Appt.ApptNum as ApptNo,
    Bump.id->Mrn as MRN,
    Bump.Id->Dob as DOB,
    Task Manager.Task.Id,
    Bump.Department,
    Bump.Id,
```

-continued

```
    Appt.Id1
FROM Sched.BumpList Bump, TaskManager.Task
    LEFT OUTER JOIN Sched.Appointment Appt ON
    (Appt.Id=Bump.Tm AND
    Appt.Dt=Bump.Dt AND
    Appt.Tm=Bump.Tm)
    LEFT OUTER JOIN Sched_ApptType.Prov Type
    ON
    (Appt.Department = Type.Department
    and
    Appt.Provider = Type.Provider
    and
    Appt.Type = Type.ApptType)
WHERE
    TaskManager.Task.TaskNm->Name='JRF BUMP LIST'
    AND Bump.Sequence > 0
    AND Bump.Department = ?
    ORDER BY Bump.DateBumped
```

The example SQL query searches an appointment application data table for appointment objects fitting specified criteria and joins each resultant appointment object with a dedicated task object having a task name or identification of 'JRF BUMP LIST'.

Figure 6:
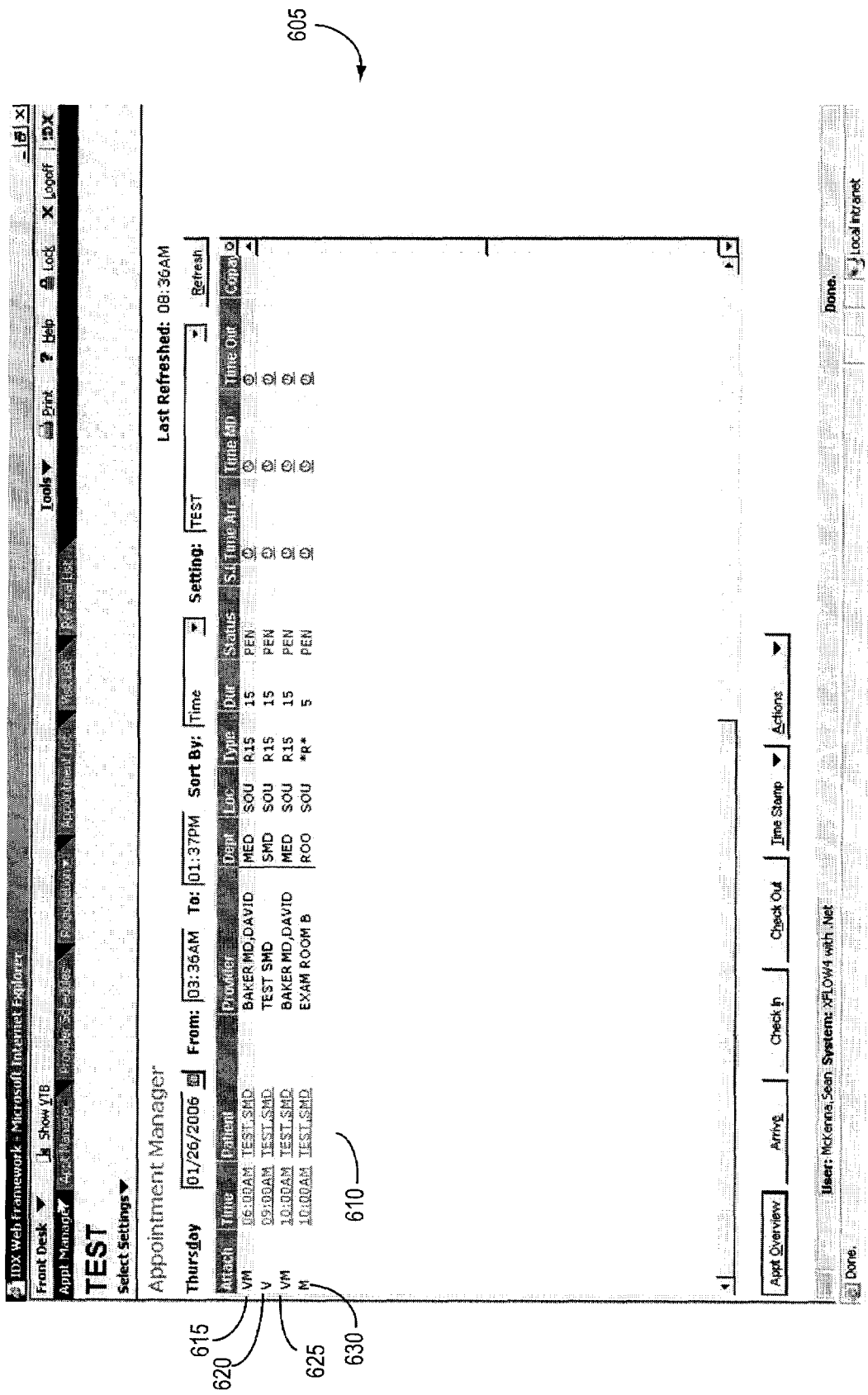
FIG. 6 illustrates a screen shot according to an embodiment of the present disclosure.

FIG. 6 illustrates an example of a display image 605. Display image 605 includes a work list 610. Work list 610 includes work items 615, 620, 625, 630, each represented as a row in work list 610. Each work item 615, 620, 625, 630 represents a conventional task object, such as task objects 506, 508 of FIG. 5, of a task object table of a task management system.

Figure 7:
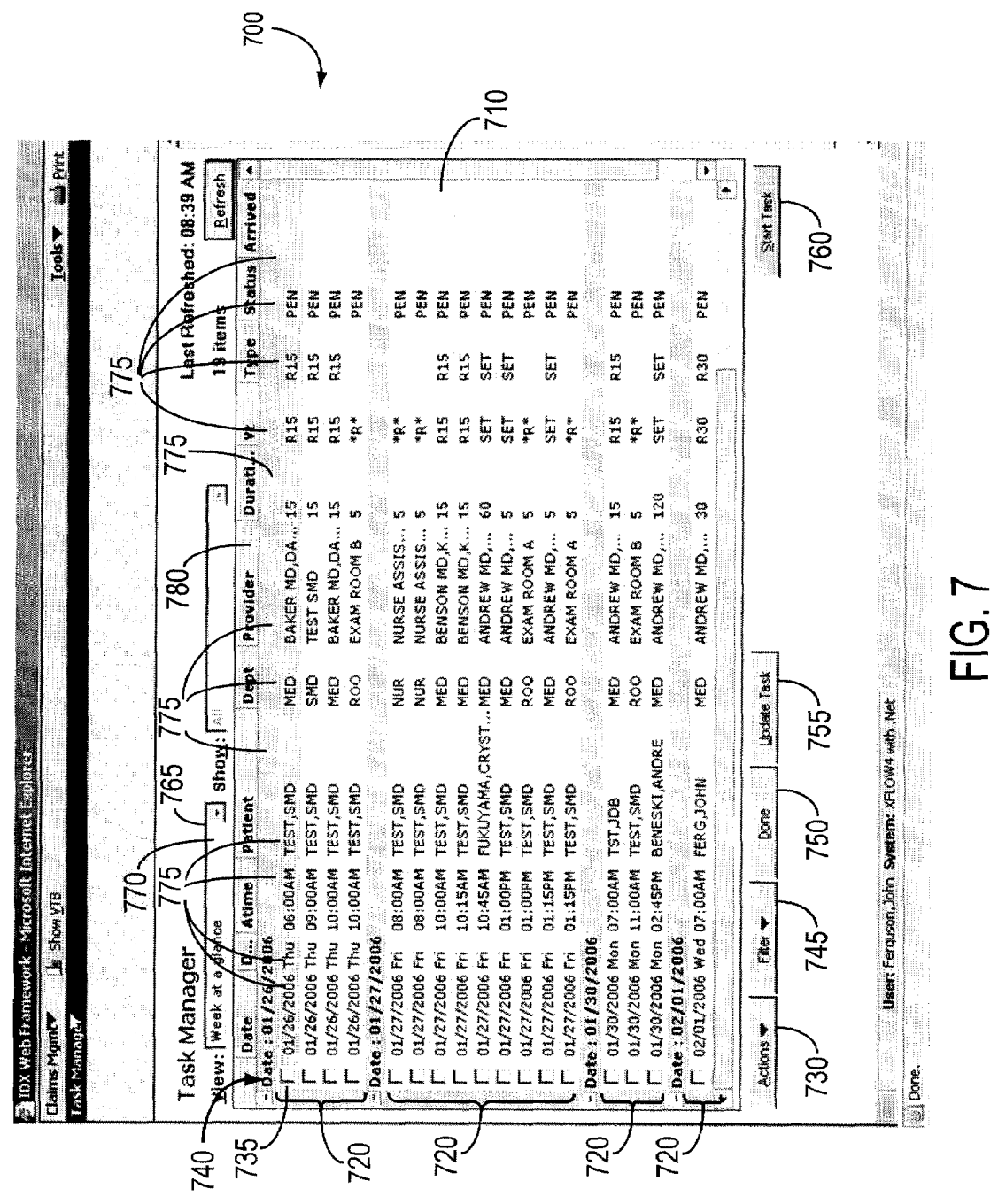

FIG. 7 illustrates one embodiment of a display image 700 generated by one example of a task management system and/or method of the present invention, such as task management system 500 of FIG. 5. Display image 700 includes a work list 710. Work list 710 includes a plurality of work items 720, each of the plurality of work items 720 represents an appointment data object of one or more application data tables other than a task object table of the task management system. Each work item 720 is arranged as a row in work list 710. A view, such as view 599 of FIG. 5, is used to associate each appointment data object with a single dedicated task object of a task object table of the task management system. Display metadata associated with the dedicated task object is utilized in generating the displayable data representing each work item 720 of work list 710.

A plurality of buttons may facilitate user interaction with work list 710. Display metadata associated with the corresponding task management system, view, and/or dedicated task object may include information defining what buttons are displayed in display image 700, how they are displayed, the functionality of each button, and other functions and characteristics of display image 700. An action button 730 allows a user to perform a variety of actions on one or more selected work items 720. In one example, one or more work items can be selected by highlighting each desired work item. For example, work item 735 is highlighted in display image 700. In another example, one or more work items may be selected by marking the corresponding box or boxes in column 740 of work list 710. A filter button 745 allows a user to arrange work items 720 in work list 710 and/or select for display a subset of work items 720. An update task button 755 allows a user to update one or more selected work items 720. A start task button 760 allows a user to start work on one or more selected work items 720.

A view selector 765 is provided as a pull-down menu. A user may select from available views in a view table of the task management system. In one example, available views and/or access to predetermined work items may be limited to a particular user based on that user's security rights and privileges as defined in the task management system and/or associated applications. Selecting different views will generate a different display image having a different worklist depending on the characteristics of the view selected. In display image 700 the week at a glance view 770 is selected. Work items 720 are arranged by date with separators 770 between days of the week. Information related to each work item 720 is provided in columns 775. A user may sort work items 720 by selecting a header, such as header 780, at the top of each column 775.

Figure 8:
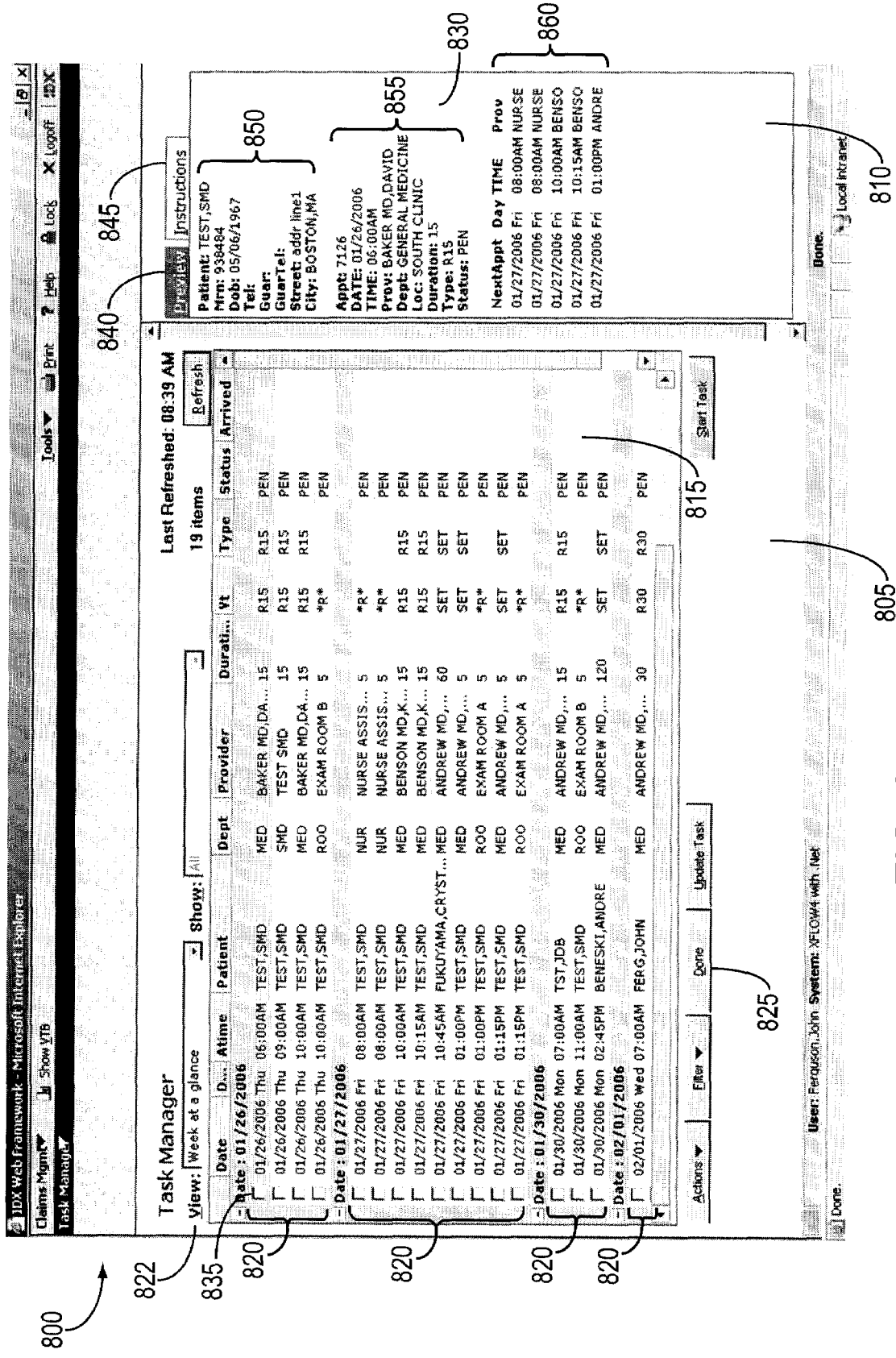
FIG. 8 illustrates a screen shot according to an embodiment of the present disclosure.

FIG. 8 illustrates another embodiment of a display image 800, generated by one example of a task management system and/or method of the present invention. Display image 800 and data representing display image 800, include a first portion 805 and a second portion 810. First portion 805 includes a work list 815 having work items 820. Each of work items 815 represent an appointment data object of one or more application data tables other than a task object table of the task management system. Each work item 820 is arranged as a row in work list 815. A view, such as view 599 of FIG. 5, is used to associate each appointment data object with a single dedicated task object of a task object table of the task management system. Display metadata associated with the dedicated task object is utilized in generating the displayable data representing each work item 820 of work list 815. The view of display image 800 is indicated with view selector 822.

A plurality of buttons 825 is provided in display image 800 to facilitate user interaction with display image 800. Example functions of plurality of buttons 825 are similar to those discussed above with respect to display image 700 of FIG. 7.

Second portion 810 includes additional data 830 about a selected work item from work list 815. FIG. 8 illustrates one selected work item 835. Second portion 810 includes additional data 830 associated with work item 835. In one example, additional data 830 also includes information associated with the dedicated task object and/or corresponding appointment data object that is represented by selected work item 835. Display metadata of the corresponding dedicated task object may provide instructions for configuration, content, and display of second portion 810. The display metadata of the corresponding dedicated task object may include links to one or more component data objects of a task management system of the present invention. A component data object may include commonly used subsets of display and other metadata, including further links to information in other data objects (including an associated application data object). By linking to one or more component data objects, the task management system may avoid may avoid duplication of the commonly used metadata in multiple task definitions and/or task objects. A task management system may include a component table having one or more component data objects.

When a user selects a different one of work items 820, second portion 810 displays additional data 830 related to that newly selected work item. In this example, each of work items 820 is associated with a single dedicated task object, the same display metadata may be used to display additional data 830 for each of work items 820.

Additional data 830 may include a variety of information associated with selected work item 835. Examples of information for additional data 830 include, but are not limited to, data representing one or more predetermined instructions for working the selected work item and/or any associated application data objects, data representing summary information related to selected work item 835 and/or any associated application data objects (including data objects associated with the application data object corresponding to selected work item 835), data representing a hyperlink to a data object (e.g., an associated application data object, an informational object, and any combinations thereof.

Second portion 810 includes a preview panel 840 and an instructions panel 845. Preview panel 840 and instruction panel 845 are tabbed and overlaid. A user may select either preview panel 840 or instruction panel 845 to be displayed in display image 800. Preview panel 840 is shown as selected and includes additional data 830 reflecting summary information related to selected work item 835. Additional data 830 of preview panel 840 is representative of information linked to the display metadata of the dedicated task object via three components. Information from a first component data object is displayed in first section 850. Information from a second component data object is displayed in second section 855. Information from a third component data object is displayed in third section 860. Each of the first, second, and third component data objects provides appropriate metadata to the associated dedicated task object for generating display image 800 and additional data 835.

Preview panel 840 includes information related to a patient object associated with the selected appointment work item 835, summary information of the appointment data object associated with selected appointment work item 835, and summary information of other appointment data objects associated with the same patient object.

Figure 9:
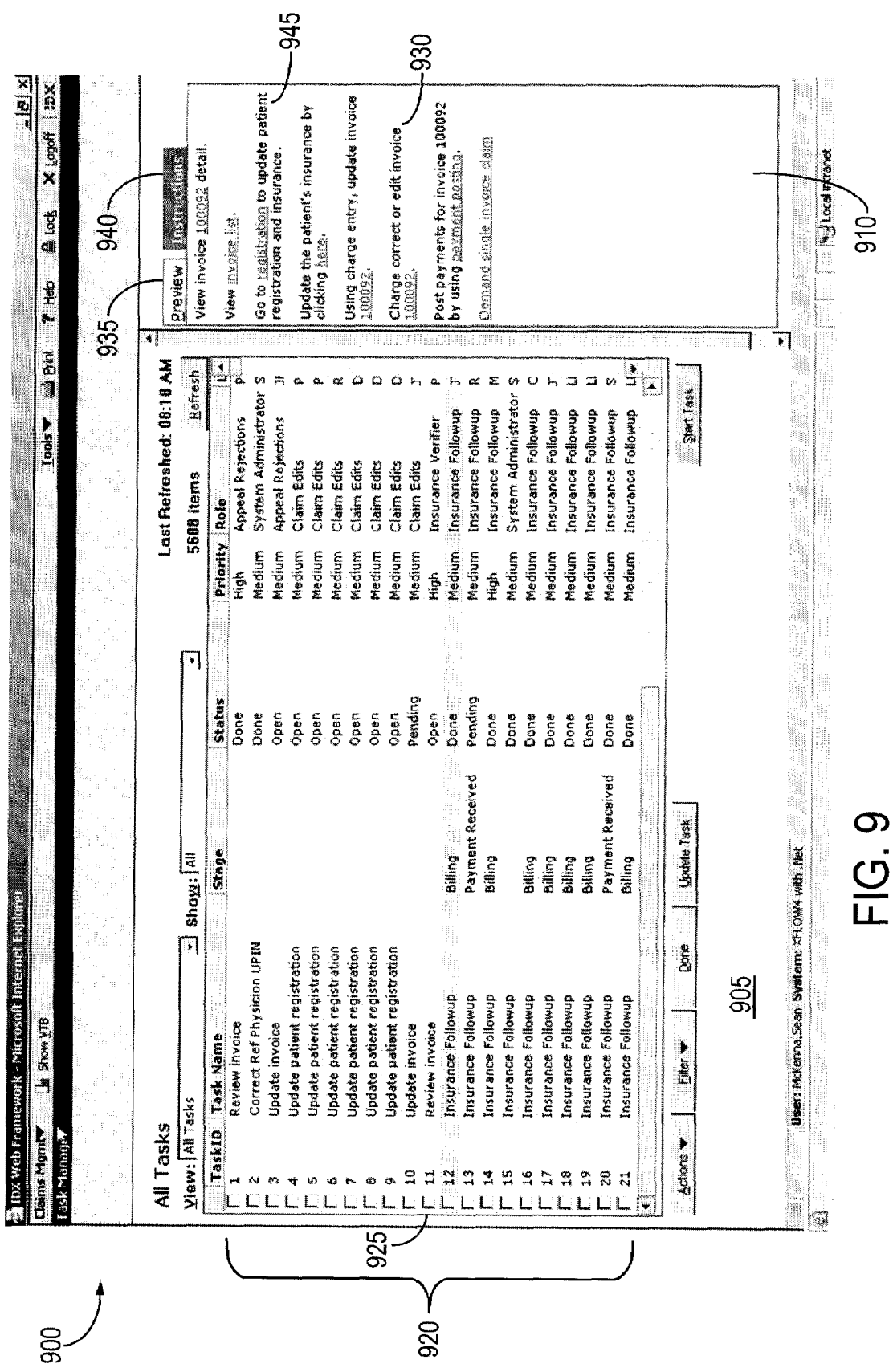
FIG. 9 illustrates a screen shot according to an embodiment of the present disclosure.

When a user selects instruction panel 845, additional data 830 reflecting predetermined instructions for working selected work item 835. FIG. 9 illustrates such an example in still another embodiment of a display image 900 generated by one example of a task management system and/or method of the present invention.

Display image 900 includes a first portion 905 and a second portion 910. First portion 905 includes a worklist 915 generated utilizing a dedicated task object of the present invention. Worklist 915 includes a plurality of work items 920. A selected work item 925 is indicated by highlighting. Second portion 910 includes additional data 930. Additional data 930 represents information associated with selected work item 925 and includes a preview panel 935 and an instructions panel 940. Instructions panel 940 is selected. Instructions panel 940 includes information 945 reflecting predetermined instructions for working selected work item 925. Information 945 includes a list of work steps and hyperlinks to data objects associated with selected work item 925.

Figure 10:
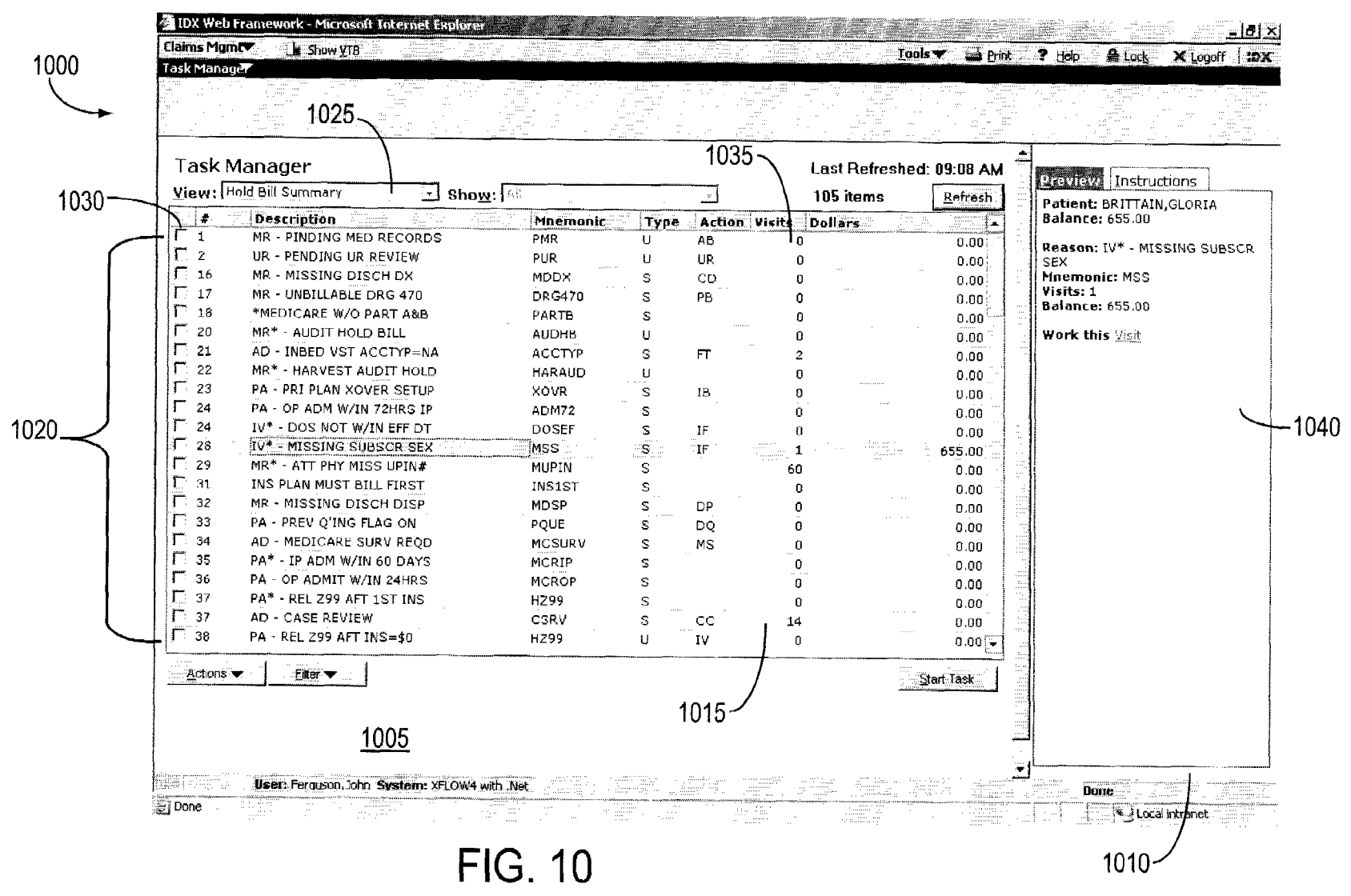

FIG. 10 illustrates a further embodiment of a display image 1000 generated by a system and/or method of the present invention. Display image 1000 includes a first portion 1005 and a second portion 1010. First portion 1005 includes a worklist 1015 having work items 1020. Worklist 1015 represents hold bill summary view 1025. Hold bill summary view 1025 reflects a view object that includes instructions for aggregating information from multiple application data objects and then associating sets of aggregated information with a dedicated task object. The aggregated sets are then displayed as individual work items 1020. For example, a selected work item 1030 all visit objects in one or more application data tables that are missing the subscriber's sex attribute. Column 1035 indicates that there is only one visit object that fits that criteria. Second portion 1010 displays additional information 1040 related to the one visit object that is missing subscriber sex, including the related patient name, account balance, a hyperlink to the associated visit object requiring work. In one alternative example where multiple visit objects are missing subscriber sex information, additional information 1040 may include preview information for each visit object in the preview panel of second portion 1010.

Figure 11:
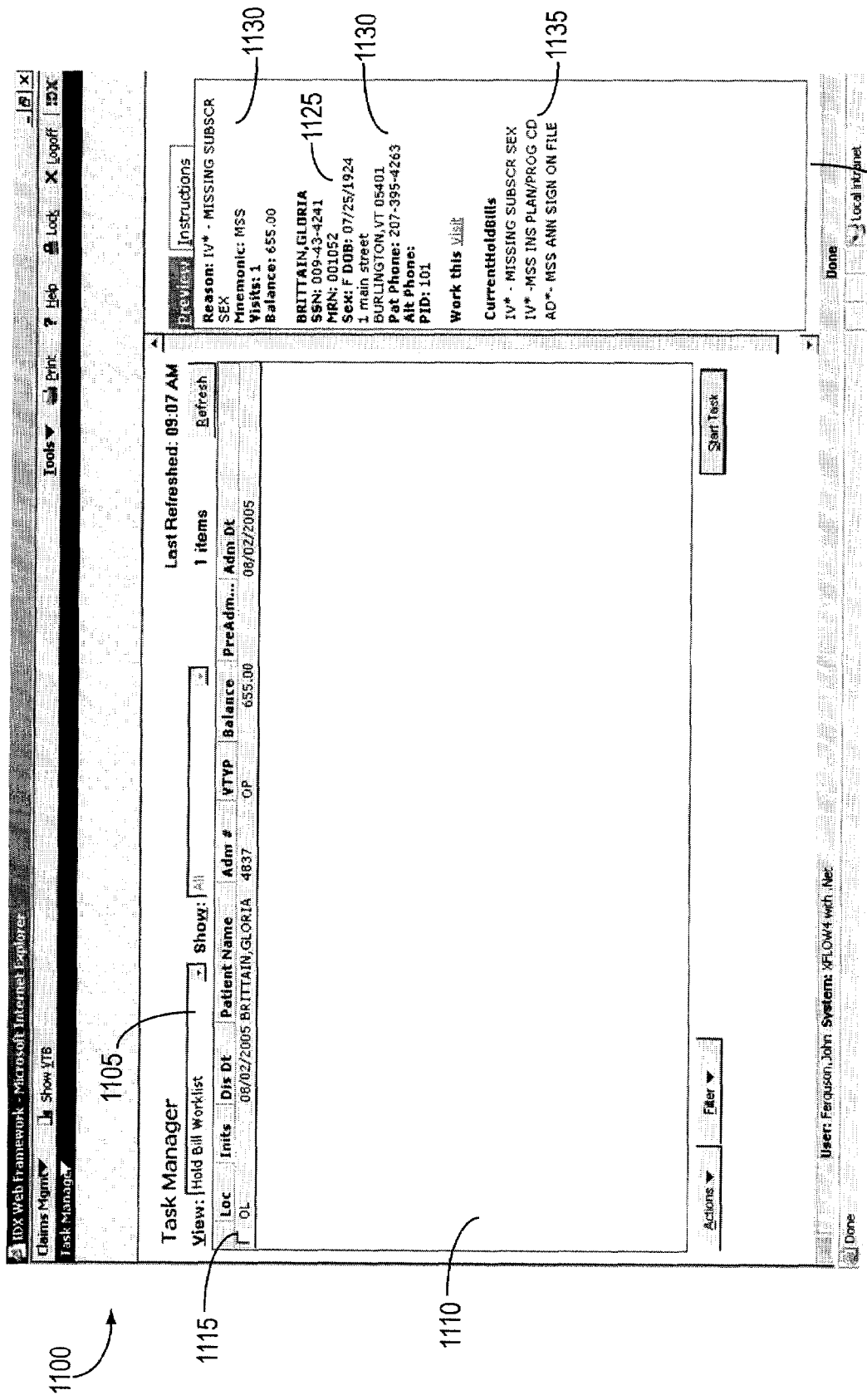
FIG. 11 illustrates a screen shot according to an embodiment of the present disclosure.

Views may have a hierarchical relationship with each other (e.g., parent child relationship). FIGS. 10 and 11 illustrate one example. Hold bill summary view 1025 summarizes hold bills by category and provides a work item 1020 for each category. FIG. 11 shows one embodiment of a display image 1100 generated by a system and/or method of the present invention. Display image 1100 includes a hold bill worklist view 1105. A worklist 1110 generated by hold bill worklist view 1105 includes a work item 1115 representative of the one visit data object associated with selected work item 1030 of FIG. 10. Work item 1115 is shown as selected by highlighting. A second portion 1120 of display image 1100 includes preview information 1125 related to work item 1115. Preview information 1125 includes information 1130 related to an associated patient object and the visit data object. Preview information 1125 also includes information 1135 related to other hold bills associated with the visit data object.

Figure 12:
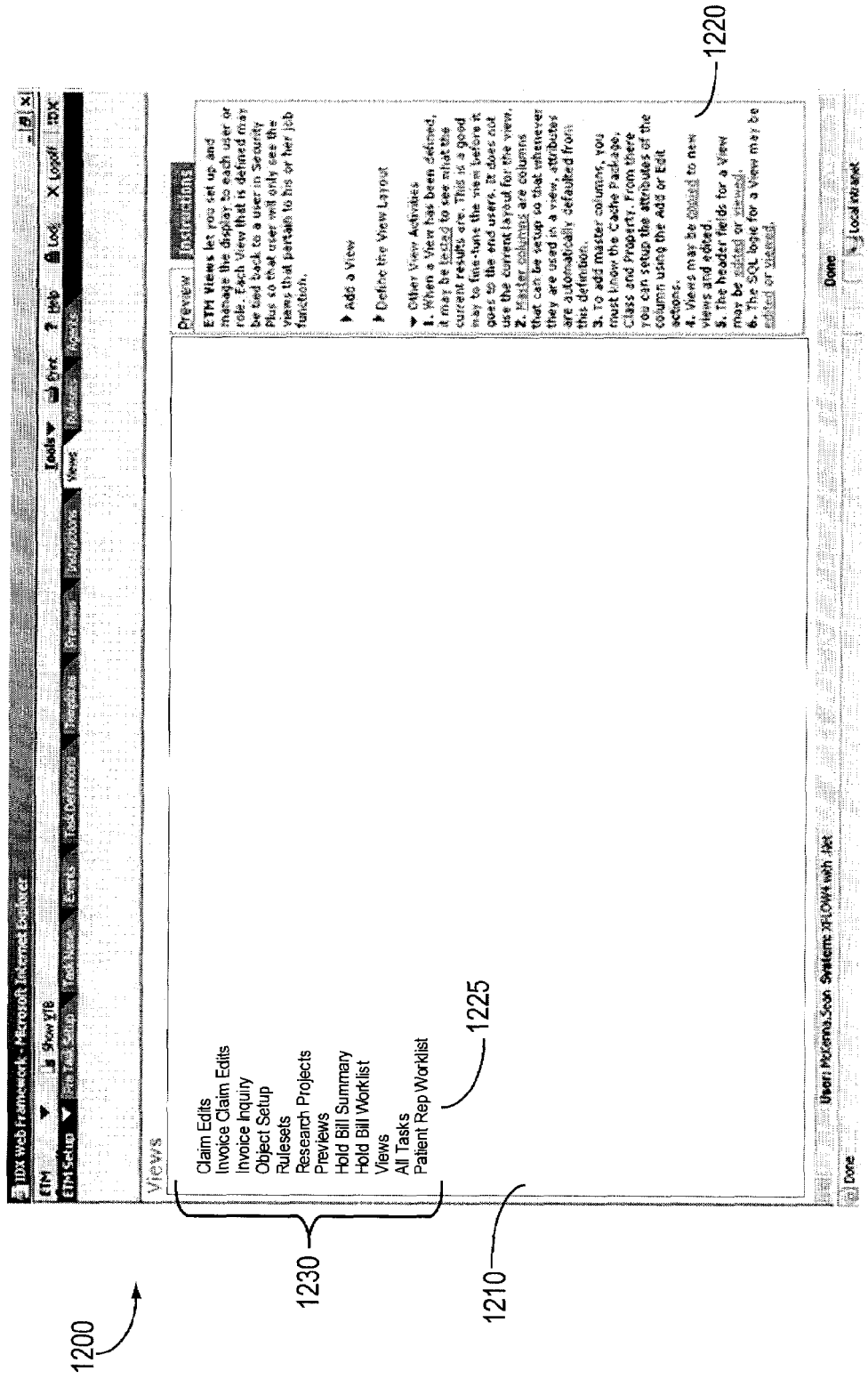
FIG. 12 illustrates a screen shot according to an embodiment of the present disclosure.

A system and method of the present invention may be used to configure one or more application configuration tables (e.g., an application configuration table for a task management system). FIG. 12 illustrates still a further embodiment of a display image 1200 generated by a system and/or method of the present invention. Display image 1200 includes a first portion 1210 and a second portion 1220. First portion 1210 includes a worklist 1225 including work items 1230. Worklist 1225 represents display data generated by associating a dedicated task object with one or more view objects of a view object table, such as view object table 598 of FIG. 5. Each view object is represented by one of work items 1230 and a single dedicated task object. Metadata of the single dedicated task object is utilized in generating a data representing a display of each work item 1230.

Figure 13:
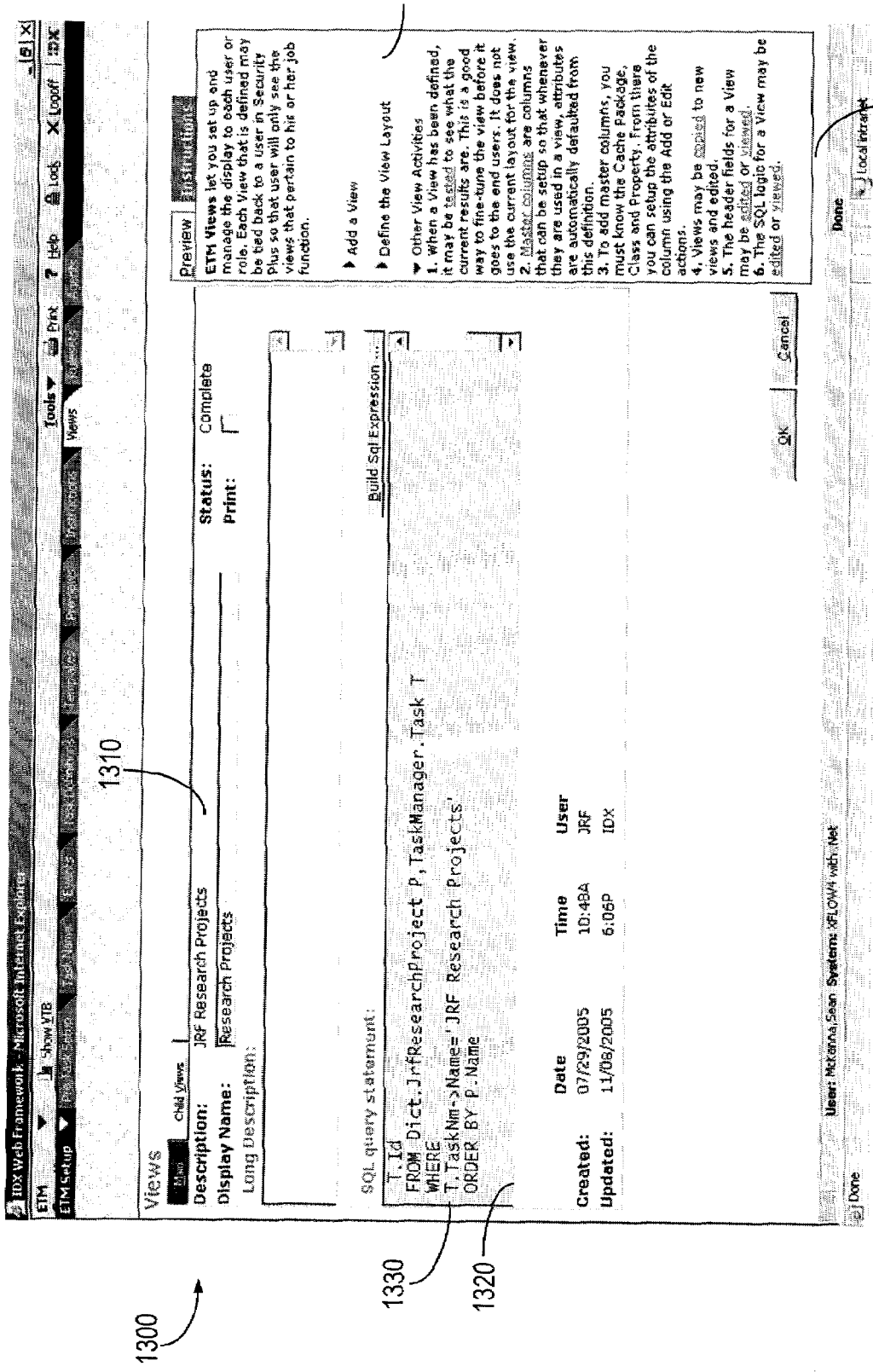
FIG. 13 illustrates a screen shot according to an embodiment of the present disclosure.

FIG. 13 illustrates an example of a display image 1300 representing data related to a view object with a descriptive identifier 1310 of JRF Research Projects. Display image 1300 includes a SQL query portion 1320 for displaying a SQL query 1330 associated with the view object. A second portion 1340 of display image 1300 includes additional information 1345 related to the view object being worked.

In another embodiment of the present invention, a view object may include instructions for determining a first set of desired application data objects from one or more application data tables and associating each desired application data object of the first set with a first dedicated task object. The view object may also include instructions for determining a second set of desired application data object from one or more application data tables and associating each desired application data object of the second set with a second dedicated task object. A display data representing a displayable worklist including a work item for each of the desired application data objects of both the first and second set may be generated utilizing display metadata associated with the corresponding first and second dedicated task objects.

In yet another embodiment of the present invention, a view object may include instructions for determining a set of desired application data objects from one or more application data tables and associating each desired application data object of the desired set with a dedicated task object. The view object may also include instructions for determining one or more task objects to be worked from a task object table of a task management system of the present invention. A display data representing a displayable worklist including a work item for each of the desired application data objects and a work item for each of the desired one or more task objects to be worked may be generated. The display data may be generated utilizing display metadata associated with the dedicated task object for the desired set of application data objects and utilizing display metadata associated with each of the one or more task objects for the corresponding one or more task objects.

In one aspect, a system and/or method of the present invention may take advantage of the tasking environment of a task management system for application data tables without the need to rewrite core code for the application data tables that has the same functionality of the tasking environment. In another aspect, a system and/or method of the present invention may leverage a dedicated task object of a task management system to allow a user to access a non-task application with the interface of the task management system. In yet another aspect, a system and/or method of the present invention may allows any application to have the interface functionality and configuration of a task management system of the present invention. In still another aspect, a system and/or method of the present invention may have one technical effect of allowing a tasking interface of a task management system to be used in accessing one or more application data tables that is not a task object table of the task management system.

The present invention has been described in terms of specific embodiments incorporating details to facilitate the understanding of the principals of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

What is claimed is:

1. A task management system for providing a graphically displayable worklist having one or more rows of work items, one or more of the work items each representing one or more data rows to be worked from one or more application data tables that are not a task object table of the task management system, the task management system comprising:

a storage medium, wherein a set of executable code is embodied on the storage medium; and a processor, wherein the processor executes the set of executable code, effectuating the operation of the following elements:

a task database having at least one task object;

a first dedicated task object in said task database, said first dedicated task object having a second metadata associated therewith for graphically displaying information related to said first dedicated task object, wherein the first dedicated task object is configured to access an application data object residing in an application data table;

a first view object having a first set of instructions for determining a first plurality of data rows of the one or more application data tables and a second set of instructions for creating a first association between each data row of said first plurality of data rows and said first dedicated task object;

a display generator for using said second metadata in initiating generation of display data representing a display image presenting a worklist, said worklist having a first one or more rows of application data table work items, each of said first one or more rows of application data table work items representing at least one data row of said first plurality of data rows; and a second dedicated task object in said task database, said dedicated task object having a third metadata associated therewith for graphically displaying information related to said second dedicated task object, wherein said first view object has a third set of instructions for determining a second plurality of data rows of the one or more application data tables and fourth set of instructions for creating a second association between each data row of said second plurality of data rows and said second dedicated task object.

2. A task management system according to claim 1, wherein each task object of said at least one task object having associated therewith a first data related to one or more target objects requiring work and a first metadata for providing a graphical display of said each task object.

3. A task management system according to claim 1, wherein said display image comprises a first portion and a second portion, said first portion including said worklist and said second portion including additional data related to a first selected row of said first one or more rows of application data table work items when said first selected row is selected.

4. A task management system according to claim 1, wherein said display image further comprises a second one or more rows of application data table work items, each of said second one or more rows of application data table work items representing at least one data row of said second plurality of data rows.

5. A task management system according to claim 1, further comprising a display device for displaying said display image.

6. A task management system according to claim 1, wherein at least one of the one or more application data tables includes application configuration data objects for a first computer application.

7. A task management system according to claim 6, wherein said second metadata includes a fifth set of instructions for initiating generation of a second display image allowing a user viewing said second display image to configure said first computer application.

8. A task management system according to claim 6, wherein said first computer application is the task management system.

9. A task management system according to claim 1, wherein said first dedicated task object is limited to one instance in said task database.

10. A task management system according to claim 9, wherein said first dedicated task object includes a third association to a target object, said target object being a system object.

11. A task management system according to claim 1, wherein at least one of said first associations is between two or more data rows of said first plurality of data rows and said first dedicated task object.

12. A task management system according to claim 11, wherein said display image summary information related to said two or more data rows of said first plurality of data rows in at least one of said first one or more rows of application data table work items.

13. A computer-implemented method of providing a displayable worklist having one or more rows of work items, the method comprising:
    executing a set of executable code stored in a storage medium with a processor, wherein when the set of executable code is executed, the following steps are effectuated:
        generating a first dedicated task object in a task database of a task management system, said first dedicated task object having associated therewith a first metadata for generating a display image of information related to said first dedicated task object, wherein the first dedicated task object is configured to access an application data object residing in an application data table;
        determining a first desired set of application data objects to be worked from one or more application data tables other than a task object table of said task management system;
        associating each data object of said first desired set with said first dedicated task object;
        using said first metadata in initiating generation of data representing a display image, said display image including a worklist having a first plurality of rows, each of said first plurality of rows representing a different one of said first desired set of application data objects;
        generating a second dedicated task object in said task database, said second dedicated task object having a second metadata associated therewith for generating a display image of information related to said second dedicated task object;
        determining a second desired set of application data objects to be worked from said one or more application data tables; and
        associating each data object of said second desired set with said second dedicated task object wherein said display image further comprises a second plurality of rows, each of said second plurality of rows representing at least one data row of said second desired set.

14. A computer-implemented method according to claim 13, further comprising using a display device to display said at least one display image.

15. A computer-implemented method according to claim 13, wherein said display image comprises a first portion and a second portion, said first portion including said worklist and said second portion including additional data related to a first selected row of said first plurality of rows when said first selected row is selected.

16. A computer-implemented method according to claim 13, further comprising working one of said first plurality of rows to configure a first computer application.

17. A computer-implemented method according to claim 13, further comprising limiting said first dedicated task object to one instance in said task database.

18. A computer-implemented method according to claim 17, further comprising associating said first dedicated task object to a system object to limit said first dedicated task object to one instance.

19. A computer-implemented method according to claim 13, further comprising including in each association between said first dedicated task object and said first desired set an association to two or more data objects of said first desired set.

20. A computer-implemented method according to claim 19, wherein said using step
    comprises displaying summary information related to said two or more data objects in a single row of said first plurality of rows.

21. A machine readable medium containing computer executable instructions implementing a method of providing a displayable worklist having one or more rows of work items, comprising:
    a first set of instruction for generating a first dedicated task object in a task database of a task management system, said first dedicated task object having associated therewith a first metadata for generating a display image of information related to said first dedicated task object, wherein the first dedicated task object is configured to access an application data object residing in an application data table;

a second set of instruction for determining a first desired set of application data objects to be worked from one or more application data tables other than a task object table of said task management system;

a third set of instruction for associating each data object of said first desired set with said first dedicated task object;

a fourth set of instructions for using said first metadata in initiating generation of data representing a display image, said display image including a worklist having a first plurality of rows, each of said first plurality of rows representing a different one of said first desired set of application data objects;

a fifth set of instructions for generating a second dedicated task object in said task database, said second dedicated task object having a second metadata associated therewith for generating a display image of information related to said second dedicated task object;

a sixth set of instructions for determining a second desired set of application data objects to be worked from said one or more application data tables; and a seventh set of instructions for associating each data object of said second desired set with said second dedicated task object wherein said display image further comprises a second plurality of rows, each of said second plurality of rows representing at least one data row of said second desired set.

* * * * *